(12) United States Patent
Kim et al.

(10) Patent No.: US 8,707,999 B2
(45) Date of Patent: Apr. 29, 2014

(54) METHOD FOR FABRICATING SOLID BODY HAVING SUPERHYDROPHOBIC SURFACE STRUCTURE AND SUPERHYDROPHOBIC TUBE USING THE SAME METHOD

(75) Inventors: Dong-Hyun Kim, Pohang (KR); Sang-Min Lee, Pohang (KR); Il-Sin Bae, Pohang (KR); Dong-Seob Kim, Pohang (KR); Duk-Hyun Choi, Pohang (KR); Chang-Woo Lee, Pohang (KR); Ji-Hoon Jeon, Pohang (KR); Seong-Ho Son, Pohang (KR); Tae-Chul Moon, Pohang (KR); Woon-Bong Hwang, Pohang (KR); Joon-Won Kim, Pohang (KR); Hyun-Chul Park, Pohang (KR); Kun-Hong Lee, Pohang (KR)

(73) Assignee: Postech Academy-Industry Foundation, Kyungsangbuk-do (KR)

( * ) Notice: Subject to any disclaimer, the term of this patent is extended or adjusted under 35 U.S.C. 154(b) by 454 days.

(21) Appl. No.: 12/442,321

(22) PCT Filed: Sep. 19, 2007

(86) PCT No.: PCT/KR2007/004554
§ 371 (c)(1),
(2), (4) Date: Mar. 20, 2009

(87) PCT Pub. No.: WO2008/035917
PCT Pub. Date: Mar. 27, 2008

(65) Prior Publication Data
US 2009/0260702 A1    Oct. 22, 2009

(30) Foreign Application Priority Data

Sep. 21, 2006  (KR) ........................ 10-2006-0091771

(51) Int. Cl.
*F15D 1/02*      (2006.01)
(52) U.S. Cl.
USPC ............................... 138/39; 138/38; 138/146

(58) Field of Classification Search
USPC .............................................. 138/38, 39, 146
See application file for complete search history.

(56) References Cited

U.S. PATENT DOCUMENTS 3,299,949 A * 1/1967 Beurtheret .................... 165/185
3,487,670 A * 1/1970 Ware ............................. 72/108
(Continued)

FOREIGN PATENT DOCUMENTS

CN    1457294       11/2003
CN    2595983 Y    12/2003
(Continued)

OTHER PUBLICATIONS

International Search Report prepared by the Korean Intellectual Property Office for International Application No. PCT/KR2007/004554, dated Jan. 7, 2008.

(Continued)

*Primary Examiner* — James Hook
(74) *Attorney, Agent, or Firm* — Sheridan Ross P.C.

(57) ABSTRACT

The present invention relates to a method for manufacturing a solid body having a superhydrophobic surface structure formed by using a surface treatment of a metal body, a replication process, and a polymer sticking phenomenon to increase efficiency of fluid transfer and prevent foreign materials from being accumulated in the tube, and a superhydrophobic fluid transfer tube using the method. The superhydrophobic fluid transfer tube includes a fluid guider and a solid body provided on a fluid contact surface of the fluid guider and has micrometer-scaled unevenness and nanometer-scaled protrusions. In the method, a plurality of nanometer-scaled holes are formed on a surface of a metal body through an anodizing process, a replica is formed by immersing the metal body provided with the nanometer-scaled holes in a non-wetting polymer material and solidifying the non-wetting polymer material, the solid body having the superhydrophobic surface is formed by removing the metal body and an anode oxide from the replica, and the solid body is provided to a fluid contact surface of a fluid guider for guiding a fluid.

5 Claims, 28 Drawing Sheets

(56) References Cited

U.S. PATENT DOCUMENTS

| | | | |
|---|---|---|---|
| 3,566,514 A * | 3/1971 | Szumigala | 29/558 |
| 4,216,826 A * | 8/1980 | Fujikake | 165/133 |
| 4,557,957 A | 12/1985 | Manniso | |
| 4,759,516 A * | 7/1988 | Grose | 244/130 |
| 5,052,476 A * | 10/1991 | Sukumoda et al. | 165/133 |
| 6,673,287 B2 * | 1/2004 | Breen et al. | 264/83 |
| 6,769,455 B2 | 8/2004 | Toas et al. | |
| 6,860,956 B2 * | 3/2005 | Bao et al. | 156/232 |
| 6,923,216 B2 * | 8/2005 | Extrand et al. | 138/39 |
| 7,870,877 B2 * | 1/2011 | McKeen et al. | 138/137 |
| 2004/0081760 A1 * | 4/2004 | Burns et al. | 427/269 |
| 2004/0209047 A1 * | 10/2004 | Extrand et al. | 428/156 |
| 2005/0173012 A1 * | 8/2005 | McKeen | 138/146 |
| 2005/0181195 A1 * | 8/2005 | Dubrow | 428/297.4 |
| 2006/0029808 A1 | 2/2006 | Zhai et al. | |
| 2006/0216476 A1 | 9/2006 | Ganti et al. | |
| 2007/0026193 A1 * | 2/2007 | Luzinov et al. | 428/141 |
| 2009/0217981 A1 * | 9/2009 | Extrand et al. | 137/1 |
| 2010/0028615 A1 * | 2/2010 | Hwang et al. | 428/172 |
| 2011/0006036 A1 * | 1/2011 | Lee et al. | 216/41 |

FOREIGN PATENT DOCUMENTS

| | | |
|---|---|---|
| CN | 1760112 A | 4/2006 |
| JP | 56-004430 A | 1/1981 |
| JP | 63-143290 | 6/1988 |
| JP | 09-155972 | 6/1997 |
| JP | 10-096599 | 4/1998 |
| JP | 10-278277 | 10/1998 |
| JP | 2000-511843 | 9/2000 |
| JP | 2002-321224 A | 11/2002 |
| KR | 20-1992-0004642 Y1 | 7/1992 |
| KR | 1020040089268 A | 10/2004 |
| KR | 10-2006-0052327 A | 5/2006 |
| WO | WO 2004/092623 | 10/2004 |

OTHER PUBLICATIONS

Written Opinion prepared by the Korean Intellectual Property Office for International Application No. PCT/KR2007/004554, dated Jan. 7, 2008.

Vorobyova et al. "Study of pillar microstructure formation with anodic oxides," Thin Solid Films, Elsevier-Sequoia S.A. Lausanne, CH, Jul. 1, 1998, vol. 324, No. 1-2, pp. 1-10.

Zhang "Replica Molding of High-Aspect-Ratio Polymeric Nanopillar Arrays with High Fidelity," Langmuir, Jan. 1, 2006, vol. 22, No. 20, p. 8595.

International Search Report prepared by the Korean Intellectual Property Office on Oct. 10, 2007 for International Application No. PCT/KR2007/003276.

Written Opinion prepared by the Korean Intellectual Property Office on Oct. 10, 2007 for International Application No. PCT/KR2007/003276.

* cited by examiner

Oil Pipeline System

METHOD FOR FABRICATING SOLID BODY HAVING SUPERHYDROPHOBIC SURFACE STRUCTURE AND SUPERHYDROPHOBIC TUBE USING THE SAME METHOD

CROSS REFERENCE TO RELATED APPLICATIONS

This application is a national stage application under 35 U.S.C. 371 of PCT Application No. PCT/KR2007/004554 having an international filing date of 19 Sep. 2007, which designated the United States, which PCT application claimed the benefit of Korea Application No. 10-2006-0091771 filed 21 Sep. 2006, the entire disclosure of each of which are hereby incorporated herein by reference.

TECHNICAL FIELD

The present invention relates to a manufacturing method of a solid body having a superhydrophobic surface structure and a superhydrophobic fluid transfer tube using the manufacturing method. More particularly, the present invention relates to a method for manufacturing a solid body having a superhydrophobic surface structure in which a superhydrophobic solid body is formed by processing a surface by using a surface treatment of a metal body, a replication process, and a polymer sticking phenomenon to increase efficiency of fluid transfer and prevent foreign materials from being accumulated in the tube, and a superhydrophobic fluid transfer tube using the method.

BACKGROUND ART

Generally, a surface of a solid body formed of a metal or a polymer has inherent surface energy, which is shown by a contact angle between the solid body and a liquid when the liquid material contacts the solid material. When the contact angle is less than 90°, hydrophilicity in which a sphere shape of a water drop is lost on a surface of the solid body to wet the surface is shown. In addition, when the contact angle is greater than 90°, hydrophobicity in which the sphere shape of the water drop is maintained on the surface of the solid body to run on the surface is shown. As an example of hydrophobicity, a water drop runs on the surface of a leaf of a lotus flower flows without wetting the leaf.

Further, when the surface of a solid body is processed so as to have slight protrusions and depressions, the contact angle of the surface may vary. That is, when the surface is processed, the hydrophilicity of a hydrophilic surface with a contact angle that is less than 90° may increase, and the hydrophobicity of a hydrophobic surface with a contact angle that is greater than 90° may increase. The hydrophobic surface of the solid body may be variously applied as follows. The hydrophobic surface can be applied to a condenser of an air conditioning system to enhance condensing efficiency. When the hydrophobic surface is applied to a drink can, the residue can be completely removed from the can and thus a recycling process of the can may be simplified. Further, when the hydrophobic surface is applied to a window glass of a vehicle, it can prevent the window glass from being steamed up when there is a difference between an indoor temperature and an outdoor temperature. When the hydrophobic surface is applied to a ship, the ship can exhibit a higher impellent force using the same power. Furthermore, when the hydrophobic surface is applied to a dish antenna, it can prevent snow from covering a surface of the dish antenna. When the hydrophobic surface is applied to a supply tube, a fluid transfer rate and a fluid transfer speed can be improved. Accordingly, since a tube may not be obstructed by foreign materials, cholesterol may not be accumulated in an artificial blood vessel, and an inside of the tube may not be corroded and water therein may not be polluted. In addition, efficiency of a pump increases since the water flow rate increases. Further, when the above characteristics are applied to a micro channel of a lab-on-a-chip, fluid in a channel may be appropriately transferred.

However, technology for varying the contact angle of the surface of the solid body in response to a specific purpose has depended on a microelectromechanical system (MEMS) process applying a semiconductor fabrication technology. Therefore, this technology is generally used for a method for forming nano-scaled protrusions and depressions on the surface of the solid body. The MEMS process is an advanced mechanical engineering technology applying semiconductor technology. However, the apparatus used for the semiconductor process is very expensive.

In order to form the nano-scaled protrusions and depressions on a surface of a solid metal body, a variety of processes, which cannot be performed under a normal working environment, such as a process for oxidizing the metal surface, a process for applying a constant temperature and a constant voltage, and a process for oxidizing and etching using a special solution, must be performed. That is, in order to perform such processes, a specifically designed clean room is required and a variety of expensive apparatuses for performing the processes are necessary.

Furthermore, due to a limitation of the semiconductor process, a large surface cannot be processed at once. As described above, according to the conventional technology, the process is very complicated and it is difficult to mass-produce the products. Furthermore, the cost for producing the products is very high. Therefore, it is difficult to apply the conventional technology.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a method for manufacturing a solid body having a superhydrophobic surface structure in which a superhydrophobic solid body is formed by processing a surface by using a surface treatment of a metal body, a replication process, and a polymer sticking phenomenon to increase efficiency of fluid transfer and prevent foreign materials from being accumulated in the tube, and a superhydrophobic fluid transfer tube using the method.

Technical Solution

An exemplary embodiment of the present invention provides a superhydrophobic fluid transfer tube having a superhydrophobic surface structure. The superhydrophobic fluid transfer tube includes a fluid guider and a solid body, where the fluid guider guides a fluid. The solid body is provided on a fluid contact surface of the fluid guider and has micrometer-scaled unevenness and protrusions having nanometer-scaled diameters.

Here, the solid body includes a base and a surface structure. The base is provided on a fluid contact surface of the fluid guider, and the surface structure has micrometer-scaled unevenness formed by a plurality of bunches formed by a plurality of adjacent protrusions that are formed on the base and have a nanometer-scaled diameter.

The micrometer-scaled unevenness are formed by the adjacent protrusions that are partly stuck to each other.

In addition, the solid body may include a base and a superhydrophobic surface structure. The base is formed on a fluid contact surface of the fluid guider and has micrometer-scaled protrusions and depressions on at least a part of the surface. The superhydrophobic surface structure includes a plurality of protrusions that respectively have a nanometer-scaled diameter and are provided along the micrometer-scaled protrusions and depressions of the base.

The protrusions respectively having the nanometer-scaled diameter are formed of a non-wetting polymer material.

The non-wetting polymer material is selected from the group consisting of polytetrahluorethylene (PTFE), fluorinated ethylene propylene copolymer (FEP), perfluoroalkoxy (PFA), and a combination thereof.

The fluid guider is formed as a tube for guiding a fluid.

Another embodiment of the present invention provides a method for manufacturing a solid body having a superhydrophobic surface structure. In the method, a plurality of nanometer-scaled holes are formed on a surface of a metal body through an anodizing process, a replica is formed by immersing the metal body provided with the nanometer-scaled holes in a non-wetting polymer material and solidifying the non-wetting polymer material, the solid body having the superhydrophobic surface is formed by removing the metal body and an anode oxide from the replica, and the solid body is provided to a fluid contact surface of a fluid guider for guiding a fluid.

The replica has a plurality of protrusions that are negatively replicated by the non-wetting polymer material filled in the nanometer-scaled holes formed in the metal body.

The protrusions form a plurality of micrometer-scaled bunches as adjacent protrusions are partly stuck to each other.

The non-wetting polymer material is selected from the group consisting of polytetrahluorethylene (PTFE), fluorinated ethylene propylene copolymer (FEP), perfluoroalkoxy (PFA), and a combination thereof.

The solid body has a flexible characteristic so that it can be applied to a curved surface of the fluid guider.

DESCRIPTION OF REFERENCE NUMERALS INDICATING PRIMARY ELEMENTS IN THE DRAWINGS

Figure 1:
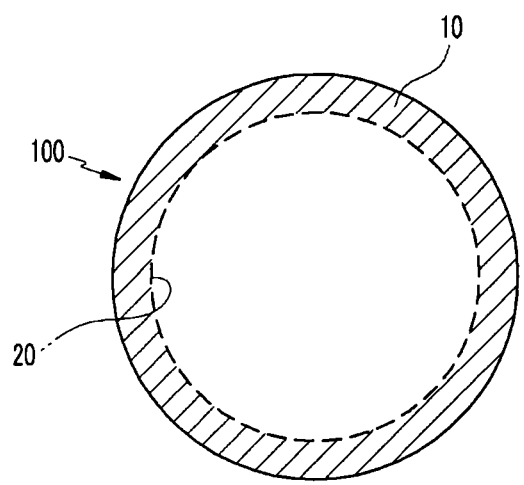
FIG. 1 is a cross-sectional view of a superhydrophobic fluid transfer tube having a superhydrophobic surface structure according to an exemplary embodiment of the present invention.

10 . . . fluid guider
30 . . . particle spray unit
33 . . . metal body
37 . . . micrometer-scaled protrusions and depressions
39 . . . nanometer-scaled holes
40 . . . anodizing device
61 . . . oil pipeline
70 . . . lab-on-a-chip
20 . . . solid body
31 . . . spray nozzle
35 . . . fine particle
50 . . . water supply tube
63 . . . pressurization facility Best Mode In the following detailed description, a manufacturing method of a solid body having a superhydrophobic surface structure according to exemplary embodiments of the present invention and a superhydrophobic fluid transfer tube using the manufacturing method will be described with reference to the figures. As those skilled in the art would realize, the described embodiments may be modified in various different ways, all without departing from the spirit or scope of the present invention.

Throughout the specification, the micrometer scale is within the range between 1 μm and 1000 μm, and the nanometer scale is within the range between 1 nm and 1000 nm.

FIG. 1 is a cross-sectional view of a superhydrophobic fluid transfer tube having a superhydrophobic surface structure according to an exemplary embodiment of the present invention.

As shown, a tube 100 having the superhydrophobic surface structure according to the exemplary embodiment of the present invention includes a fluid guider 10 for guiding fluid and a solid body 20 that is provided on a fluid contact surface of the fluid guider 10 and has a dual-scaled structure having unevenness of micrometer scale and protrusions of nanometer scale.

The fluid guider 10 is provided to guide fluid. In addition, the fluid guider 10 may be variously used as a water supply tube, an artificial blood vessel, or an oil pipeline. The solid body 20 is provided on the fluid contact surface of the fluid guider 10.

FIG. 2A to FIG. 2F are diagrams representing a method for manufacturing a solid body by processing a superhydrophobic surface according to a first exemplary embodiment of the present invention.

The method for manufacturing the solid body 20 according to the first exemplary embodiment of the present invention will now be described.

Firstly, a spray nozzle 31 of a particle spray unit 30 is positioned to face a surface 33a of a metal body 33.

Figure 2A:
FIG. 2A to FIG. 2F are diagrams representing a method for manufacturing a solid body by processing a superhydrophobic surface according to a first exemplary embodiment of the present invention.
Figure 2B:
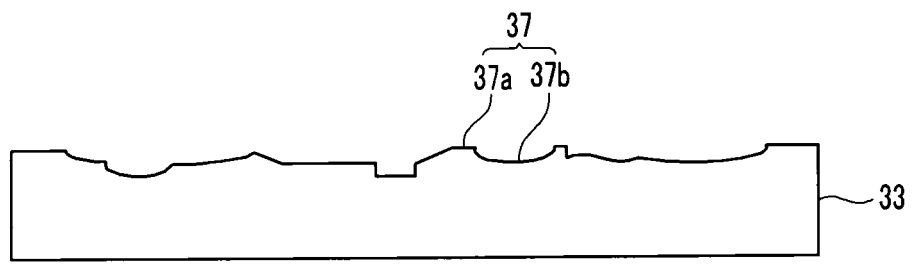
Figure 3:
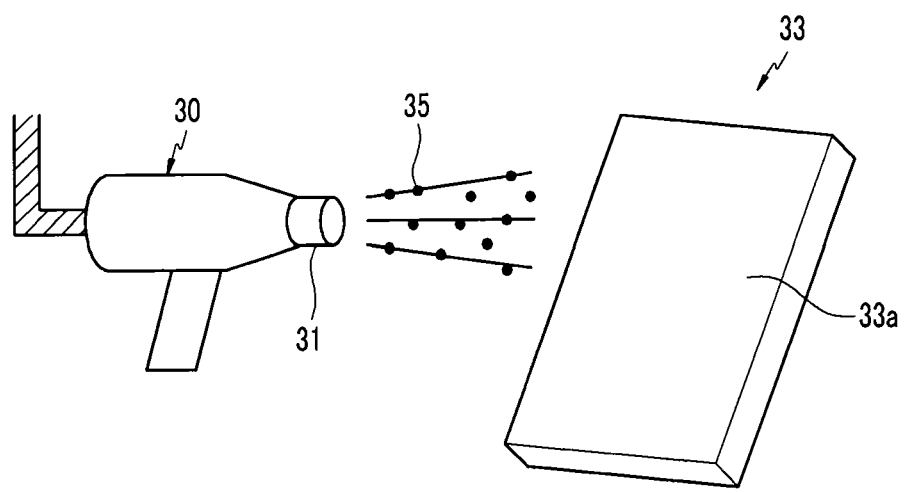
FIG. 3 is a diagram of a processing operation of micrometer-scaled protrusions and depressions by using a particle spray unit.

Subsequently, the particle spray unit 30 is driven to spray fine particles 35 (e.g., particles having a diameter of micrometers) on the surface 33a of the metal body 33. As shown in FIG. 3, the particle spray unit 30 sprays the fine particles 35 on the surface 33a of the metal body 33 with a predetermined speed and pressure so that the fine particles 35 collide with the surface 33a. When the fine particles 35 collide with the surface 33a of the metal body 33, the surface 33a of the metal body 33 receives impact energy, and therefore a shape of the surface 33a of the metal body 33 is transformed, as shown in FIG. 2B. A sand blaster for spraying sand particles may be used as the particle spray unit 30 to spray fine particles such as metal balls rather than sand particles. Aluminum, steel, or copper plates may be used as the metal body. Micrometer-scale protrusions and depressions are formed on the surface of the metal body 33 by driving the particle spray unit 30.

Figure 4:
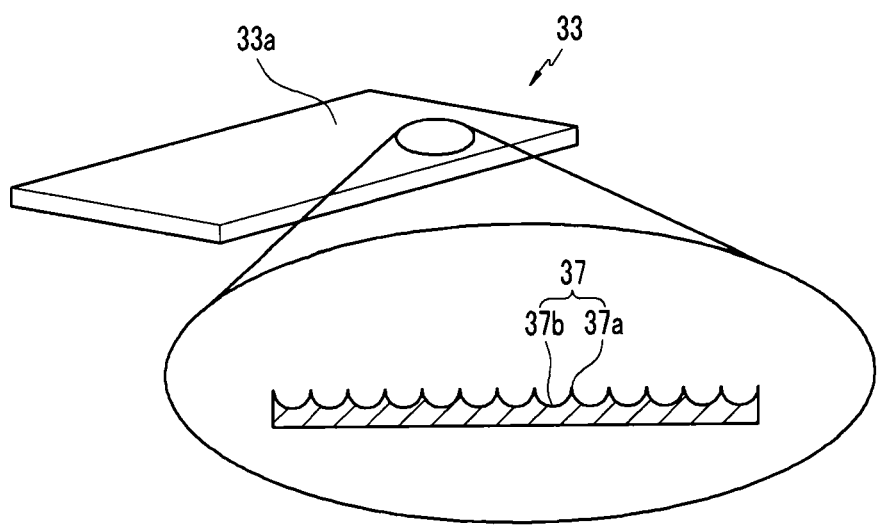
FIG. 4 is a perspective view of a metal body having micrometer-scaled protrusions and depressions.
Figure 5:
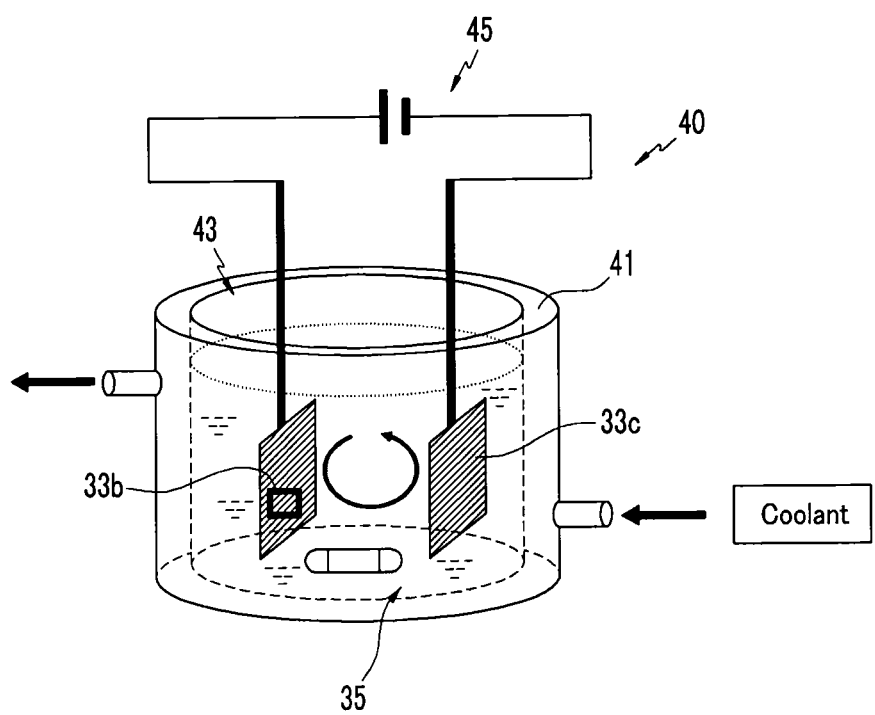
FIG. 5 is a schematic diagram representing an anodizing treatment process.
Figure 6:
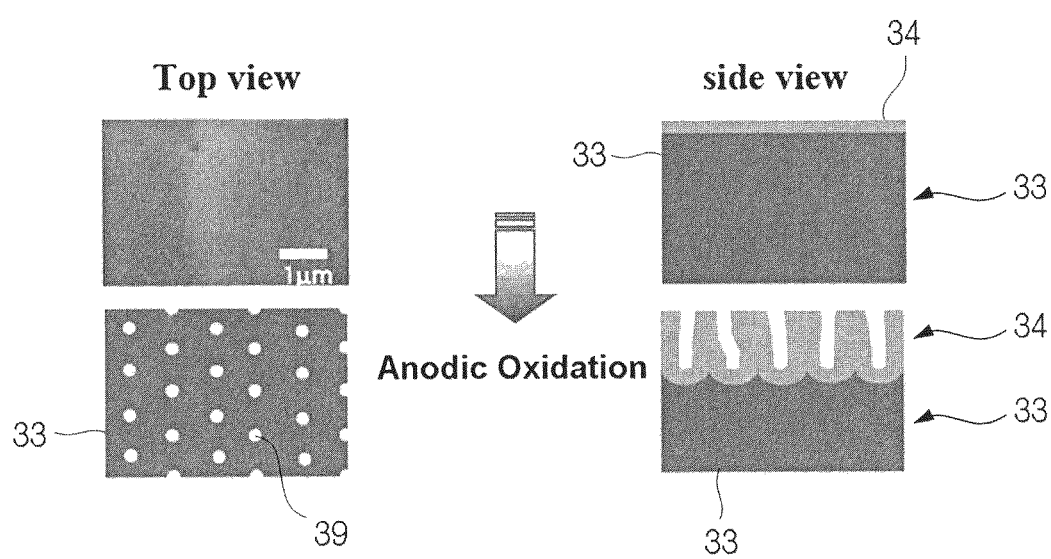
FIG. 6 is a top-view and a side view representing states before and after the anodizing treatment process in FIG. 5.
Figure 7:
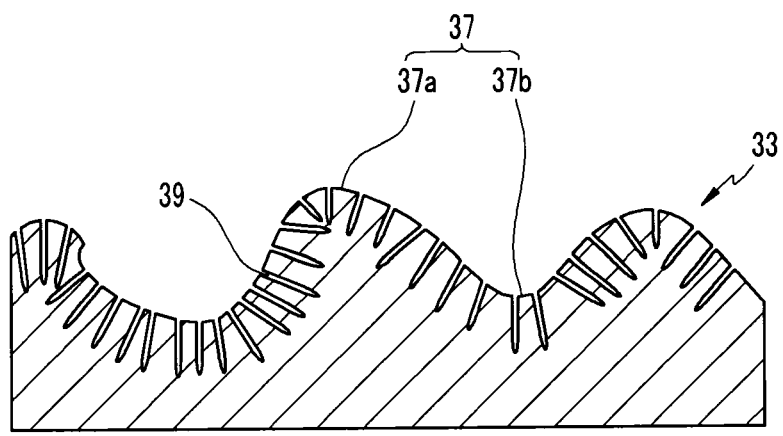
FIG. 7 is a diagram representing a metal body surface that is anodized to have micrometer-scaled protrusions and depressions.

FIG. 4 is a perspective view of the metal body having micrometer-scaled protrusions and depressions. As shown, in the metal body 33 having micrometer-scaled protrusions and depressions 37 on a surface thereof, the micrometer-scaled protrusions and depressions 37 (i.e., the height of a protrusion 37a, the depth of a depression 37b, or the distance between the protrusions 37a) may vary according to a spray speed, a spray pressure, and a size of the fine particles, which may be adjusted by predetermined values.

Except for superhydrophobic materials, a solid material such as a metal or a polymer is generally a hydrophilic material having a contact angle that is less than 90°. When a surface of the hydrophilic material is processed to have the micrometer-scaled protrusions and depressions 37 by the surface processing method according to the exemplary embodiment of the present invention, the contact angle is decreased, and the hydrophilicity increases.

Figure 2C:
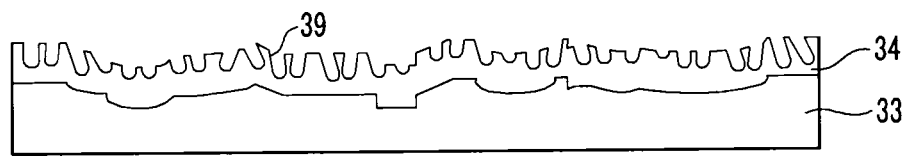
Figure 8A:
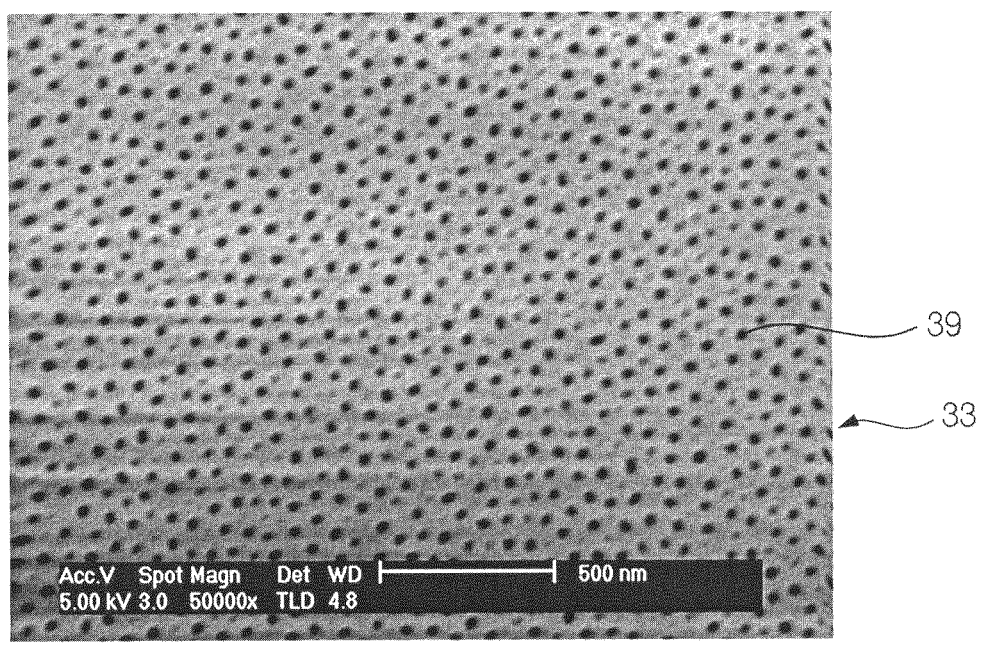
FIG. 8A and FIG. 8B are scanning electron microscope (SEM) images of the surface of the metal body having the nanometer-scaled holes formed by the anodizing process.
Figure 8B:
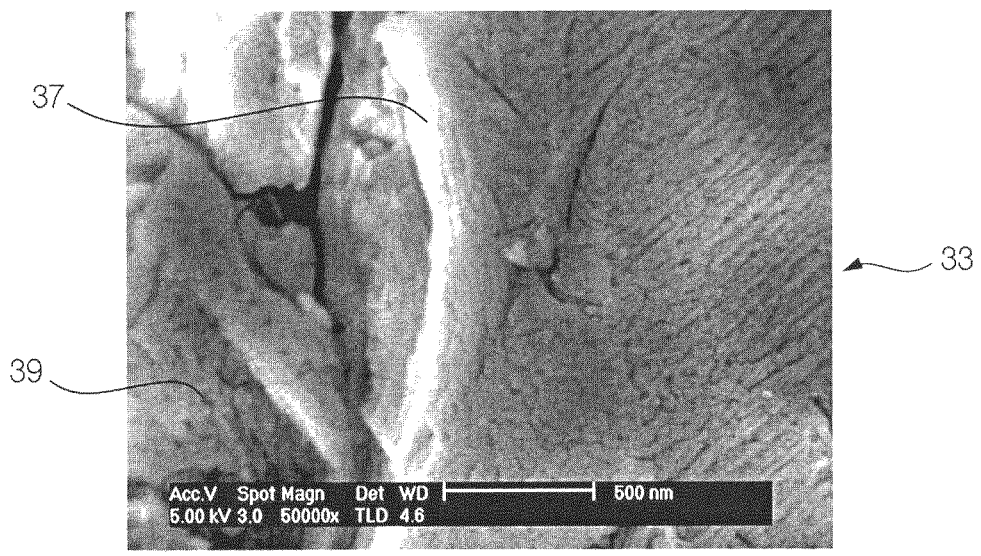

Subsequently, an anodizing process is performed on the surface of the metal body 33 having the micrometer-scaled protrusions and depressions 37, as shown in FIG. 2C. Since fine holes 39 having nanometer diameters are formed on the surface of the metal body 33, the micrometer-scale protrusions and depressions 37 and the fine holes 39 of nanometer diameter are formed on the surface of the metal body 33. In further detail, the metal body 33 is immersed in an electrolyte solution 43, and an anode is applied to a metal body 33b and a cathode is applied to a metal body 33c. Thereby, alumina, which is an oxide layer, is formed on the surface of the metal body 33 and an anode oxide portion 34 is formed on the surface of the metal body 33. Since the micrometer-scale protrusions and depressions 37 and the fine holes 39 of nanometer diameter are formed on the surface of the metal body 33 by the anodizing process, a micrometer-scaled protrusion and depression surface may be formed. FIG. 8A and FIG. 8B are scanning electron microscope (SEM) images of the surface of the metal body 33 having the nanometer-scaled holes 39 formed by the anodizing process.

Figure 2D:
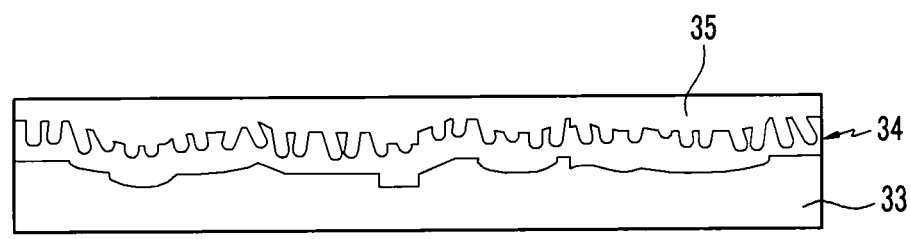
Figure 2E:
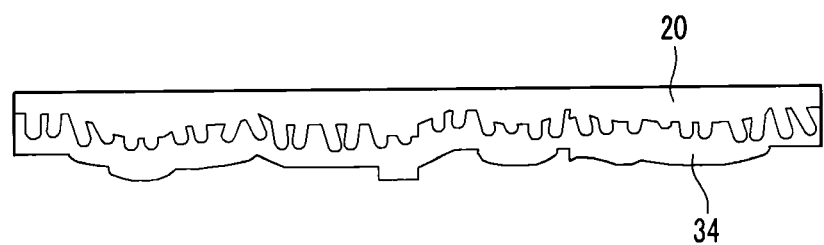

Subsequently, the metal body 33 is immersed in the superhydrophobic material 35, and the superhydrophobic material 35 is solidified as shown in FIG. 2D. Accordingly, since the superhydrophobic material 35 is solidified as shown in FIG. 2E, a hydrophobic polymer replica 36 is formed. That is, when the hydrophobic polymer material 35 is solidified while the hydrophobic polymer material is provided to surround a side surface of the metal body 33, a hydrophobic polymer replica 36 having a cathode-shaped surface corresponding to the surface of the metal body 33 may be generated. The superhydrophobic material 35 may be formed of at least one material of polytetrahluorethylene (PTFE), fluorinated ethylene propylene copolymer (FEP), and perfluoroalkoxy (PFA).

Figure 2F:
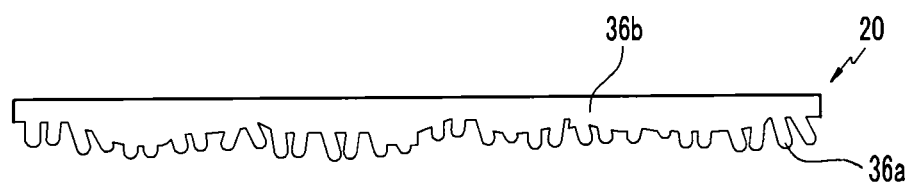

Subsequently, as shown in FIG. 2F, the anode oxide portion 34 and the metal body 33 are removed from the surface of the hydrophobic polymer replica 36. When the thin metal body is formed of aluminum and thus the anode oxide portion is the alumina, the metal body and the alumina can be removed through a wet-etching process. Accordingly, since the replica of a surface shape of the metal body 33 is realized on the surface of the hydrophobic polymer replica 36, the hydrophobic polymer replica 36 having a surface with minimum hydrophilicity may be formed.

The surface of the hydrophobic polymer replica 36 has a plurality of protrusions 36a having diameters that are the same as those of the micrometer-scale protrusions and depressions and the nanometer-scaled holes. In further detail, the hydrophobic polymer replica 36 includes a base 36b in which the micrometer-scaled protrusions and depressions are formed on at least a part of the surface of the base, and a plurality of protrusions 36a formed along the micrometer-scaled protrusions and depressions of the base 36b to have nanometer diameters as shown in FIG. 2F. The protrusions 36a are formed of a hydrophobic polymer material. FIG. 8A and FIG. 8B are scanning electron microscope (SEM) images of the solid body 33 having a superhydrophobic surface structure.

Figure 9:
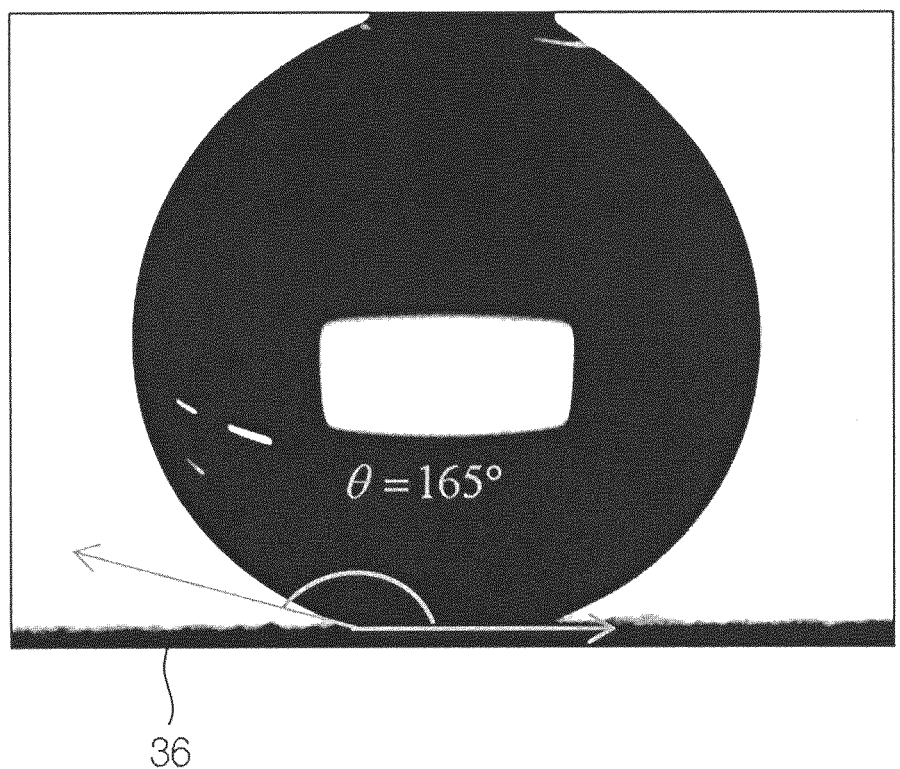
FIG. 9 is a diagram representing a hydrophilicity experiment of the solid body according to the first exemplary embodiment of the present invention.

FIG. 9 is a diagram representing a hydrophilicity experiment of the hydrophobic polymer replica by using a hydrophobic polymer solution. As shown, the surface of the polymer replica 36 has a contact angle that is greater than 165° since the micrometer-scale protrusions and depressions and the protrusions of nanometer scale are formed. In this case, the contact angle of fluid on the surface of an unprocessed solid material is 83°, and the surface of the polymer replica 36 has superhydrophobicity.

Figure 10A:
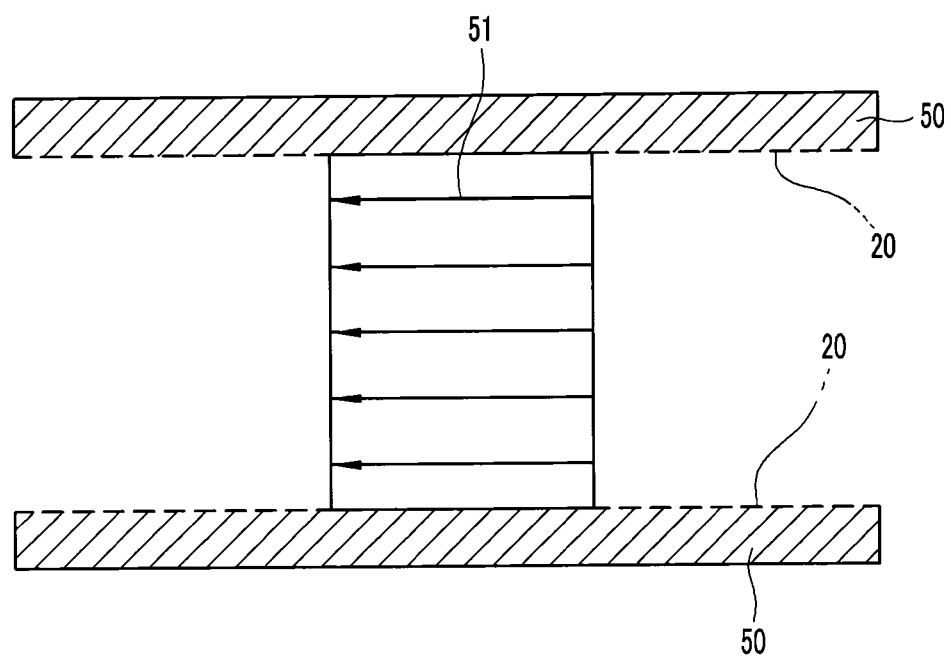
FIG. 10A is a diagram of a fluid supply tube to which the solid body according to the first exemplary embodiment of the present invention is applied.

FIG. 10A is a diagram of a water supply tube 50 to which the solid body 20 is applied.

Figure 10B:
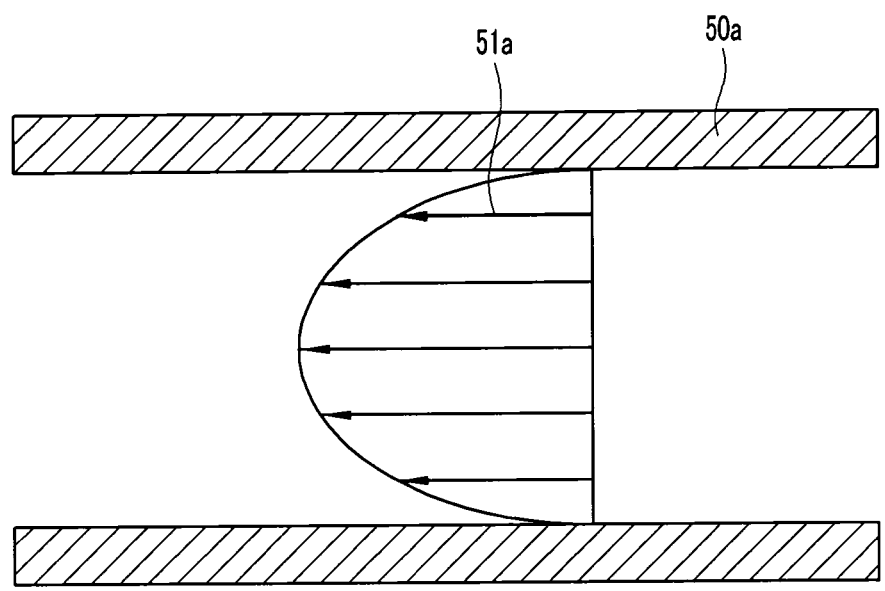
FIG. 10B is a diagram representing a fluid flow in a conventional tube.

As shown, the solid body 20 according to the exemplary embodiment of the present invention is formed in a film shape and is provided on a fluid contact surface in the water supply tube 50. Since the solid body 20 has a superhydrophobic characteristic, an inner surface of the water supply tube 50 is in a slippery state and a fluid 51 flows at a uniform speed throughout the diameter as shown in FIG. 10A. However, as shown in FIG. 10B, since a conventional water supply tube 50a has resistance on the inner surface, a fluid 51a flows more rapidly in the middle of the water supply tube 50a. That is, when comparing the conventional water supply tube 50a and the water supply tube 50 using the solid body 20 according to the exemplary embodiment of the present invention, the water supply tube 50 has superhydrophobicity on the fluid contact surface and the fluid flows on the inner surface of the water supply tube 50 at a uniform speed. Accordingly, since the amount of fluid flowing for each cross-section increases in the water supply tube according to the exemplary embodiment of the present invention, efficiency is increased. The solid body 20 is required to have a flexible characteristic so as to be applied to a water supply tube in which fluid flows.

Figure 11A:
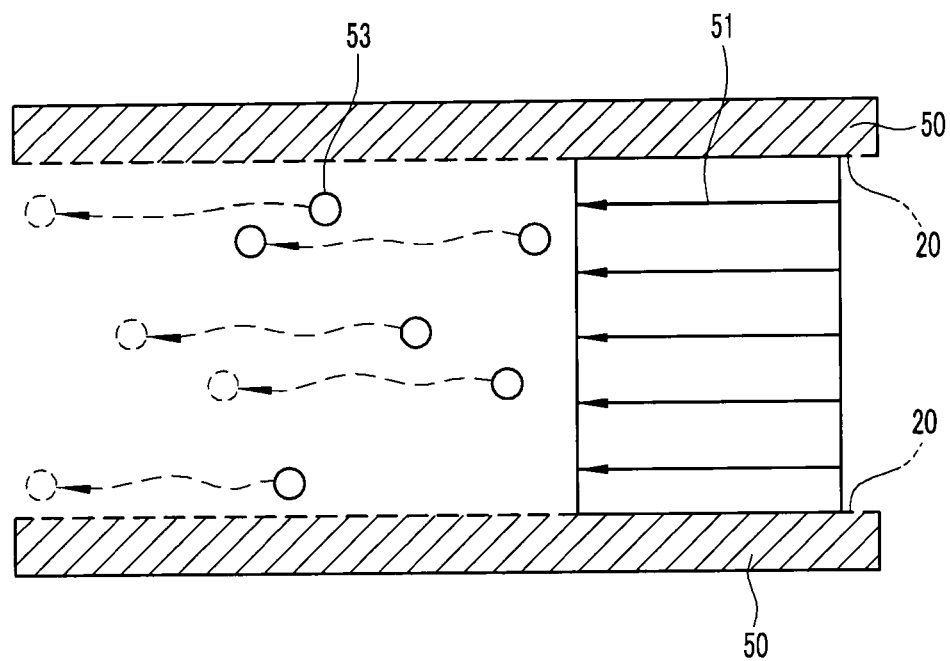
FIG. 11A is a diagram representing a flow of foreign materials in the tube to which the solid body according to the first exemplary embodiment of the present invention is applied.
Figure 11B:
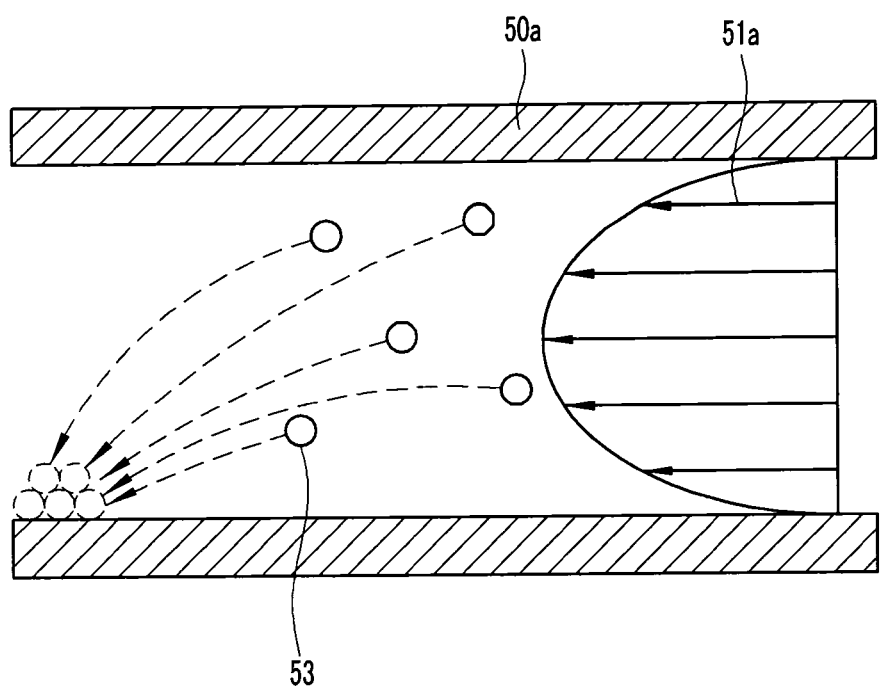
FIG. 11B is a diagram representing a flow of foreign materials in a conventional tube.

FIG. 11A is a diagram representing a flow of foreign materials in the tube to which the solid body according to the first exemplary embodiment of the present invention is applied, and FIG. 11B is a diagram representing a flow of foreign materials in a conventional tube.

As shown, in addition to the fluid 51, foreign materials 53 flow through the conventional water supply tube and artificial blood vessel. That is, the foreign materials 53 in the fluid and the foreign materials 53 generated by corrosion of the tube flow along with the fluid and the foreign materials 53 are accumulated by the resistance of the inner surface of the conventional water supply tube 50a, as shown in FIG. 11B, and thereby fluid transfer efficiency is reduced. However, as shown in FIG. 11A, since the inner surface of the tube using the solid body 20 according to the exemplary embodiment of the present invention has superhydrophobicity, the foreign materials are not accumulated and so the fluid is smoothly transferred. In addition, since the solid body 20 according to the exemplary embodiment of the present invention has excellent characteristics against corrosion, the tube is prevented from being corroded and additional foreign materials are thereby prevented, and so an environmentally-friendly tube line may be maintained.

Figure 12:
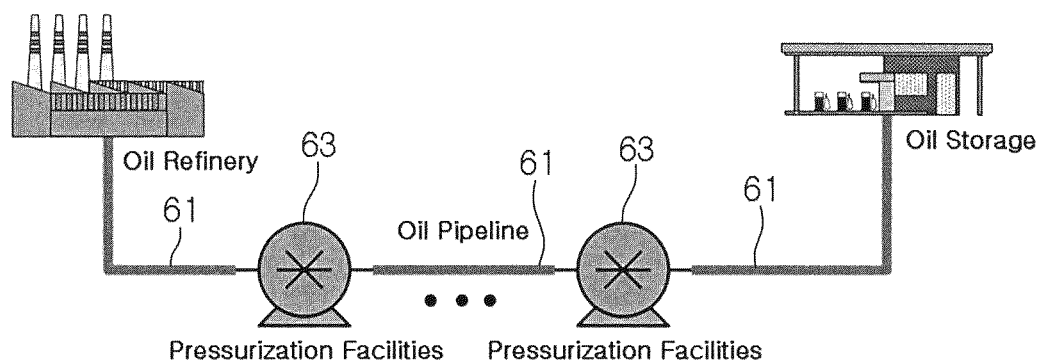
FIG. 12 is a diagram representing an oil pipe line system using the solid body according to an exemplary embodiment of the present invention.

FIG. 12 is a diagram representing an oil pipe line system using the solid body.

As shown, pressurization facilities 63 are provided in an oil pipeline 61, and one pressurization facility 63 is used to transfer a fluid in an oil pipeline 61 to the subsequent pressurization facility 63. A distance between the pressurization facilities 63 is determined by considering a pressure loss caused by friction of an internal surface of the oil pipeline 61. That is, since the distance between the pressurization facilities 63 increases as the friction between the inner surface of the oil pipeline 61 and fluid is reduced, the number of pressurization facilities 63 can be reduced. Since an inner surface of a conventional oil pipeline is not in a slippery state of superhydrophobicity, pressure is considerably lost by friction. However, since the inner surface of the oil pipeline using the solid body 20 according to the exemplary embodiment of the present invention is in the slippery state of superhydrophobicity, pressure loss caused by friction may be reduced and a fluid transfer rate may be increased.

Figure 13:
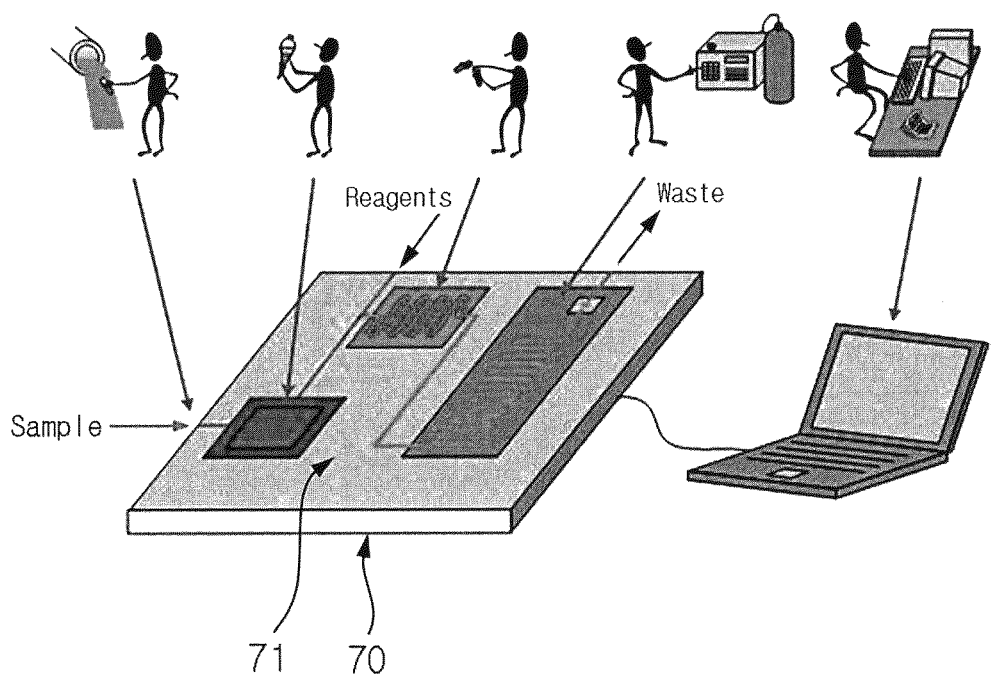
FIG. 13 is a diagram representing a lab-on-a-chip using the solid body according to an exemplary embodiment of the present invention.

FIG. 13 is a diagram representing a lab-on-a-chip using the solid body according to the exemplary embodiment of the present invention. A lab-on-a-chip 70, which is a chemical micro-process formed by integrating various devices required for analysis on a predetermined-size chip, analyzes fluid. A micro-sized channel 71 is formed in the lab-on-a-chip 70 to control a fluid flow. When the solid body according to the exemplary embodiment of the present invention is applied to an inner surface of the micro-sized channel 71, a fluid flows more appropriately in the channel 71, and therefore fluid analysis efficiency may increase.

FIG. 14A to FIG. 14D are diagrams representing a method for manufacturing a solid body by processing a superhydrophobic surface according to a second exemplary embodiment of the present invention. In FIG. 1 to 13, like reference numerals indicate like parts.

As shown, a solid body 80 according to the second exemplary embodiment of the present invention includes a base 81 provided on the fluid contact surface of the fluid guider 10 and a plurality of protrusions 83 having nanometer diameters on the base 81. The plurality of protrusions 83 are grouped to form micrometer-sized protrusions.

The method for manufacturing the solid body 80 according to the second exemplary embodiment of the present invention will now be described with reference to FIG. 14A to FIG. 14D.

Figure 14A:
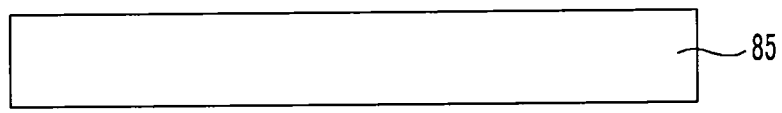
FIG. 14A to FIG. 14D are diagrams representing a method for manufacturing a solid body by processing a superhydrophobic surface according to a second exemplary embodiment of the present invention.

Firstly, a metal body 85 formed in a thin plate shape as shown in FIG. 14A is provided to a space of an anodizing device 40. The metal body 85 is provided to the electrolyte solution 43 of the anodizing device 40.

Figure 14B:
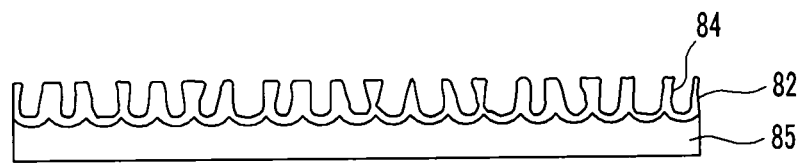

Subsequently, by driving the anodizing device 40, an anodizing process is performed on a surface of the metal body 85 as shown in FIG. 14B.

Figure 14C:
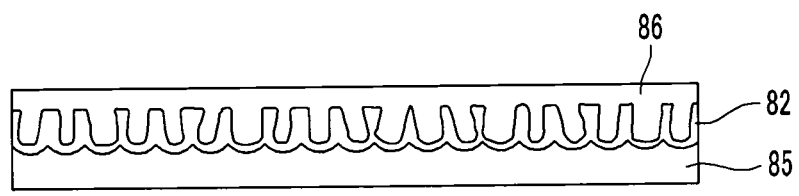

Then, the anodized metal body 85 is provided to a superhydrophobic polymer solution 35. Subsequently, when the superhydrophobic polymer solution surrounding the metal body 85 is solidified, a hydrophobic polymer replica 86 is formed as shown in FIG. 14C.

Figure 14D:
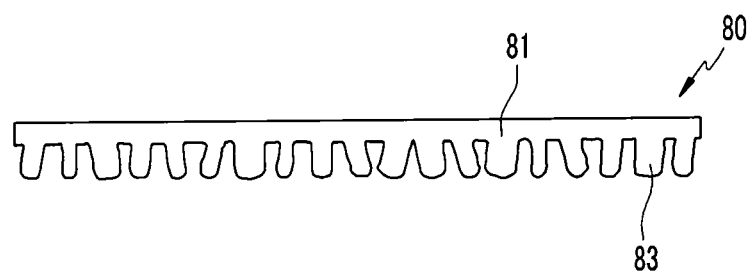

As shown in FIG. 14D, an anode oxide portion 82 and the metal body 85 are removed from the hydrophobic polymer replica 86. When the metal body 85 is formed of aluminum and thus the anode oxide portion is alumina, the metal body and the alumina can be removed through a wet-etching process. Accordingly, replication of a surface shape of the metal body 80 is realized on the surface of the hydrophobic polymer replica 86, thereby making it possible to form a polymer solid body 80 having a superhydrophobic surface with minimum wettability.

The polymer solid body 80 includes the plurality of protrusions 83 having a diameter that is the same as that of nanometer-scaled holes 84. Since the protrusions 83 are protruded with a nanometer-scaled diameter, attraction is generated between the adjacent protrusions 83. That is, due to van der Waals force, which is an attraction generated when a distance between adjacent members is extremely short, a phenomenon where the adjacent protrusions 83 are stuck to each other occurs. By the sticking phenomenon, the protrusions 83 of the polymer solid body 80 form a plurality of bunches that are settled down as a whole. Accordingly, the polymer solid body having a micrometer-scaled surface formed with the nanometer-scaled protrusions can be obtained.

Figure 15A:
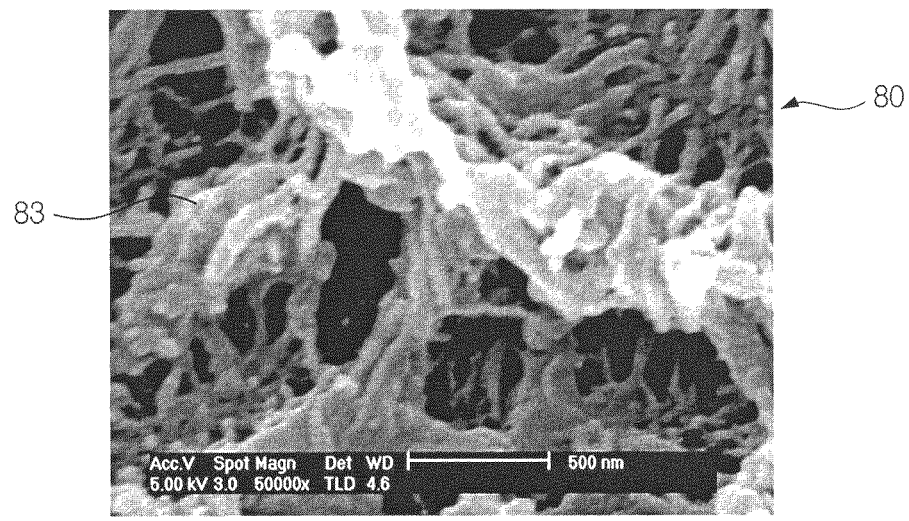
FIG. 15A and FIG. 15B are scanning electron microscope (SEM) images of a solid body having a superhydrophobic surface that is formed using a sticking phenomenon by van der Waals force.
Figure 15B:
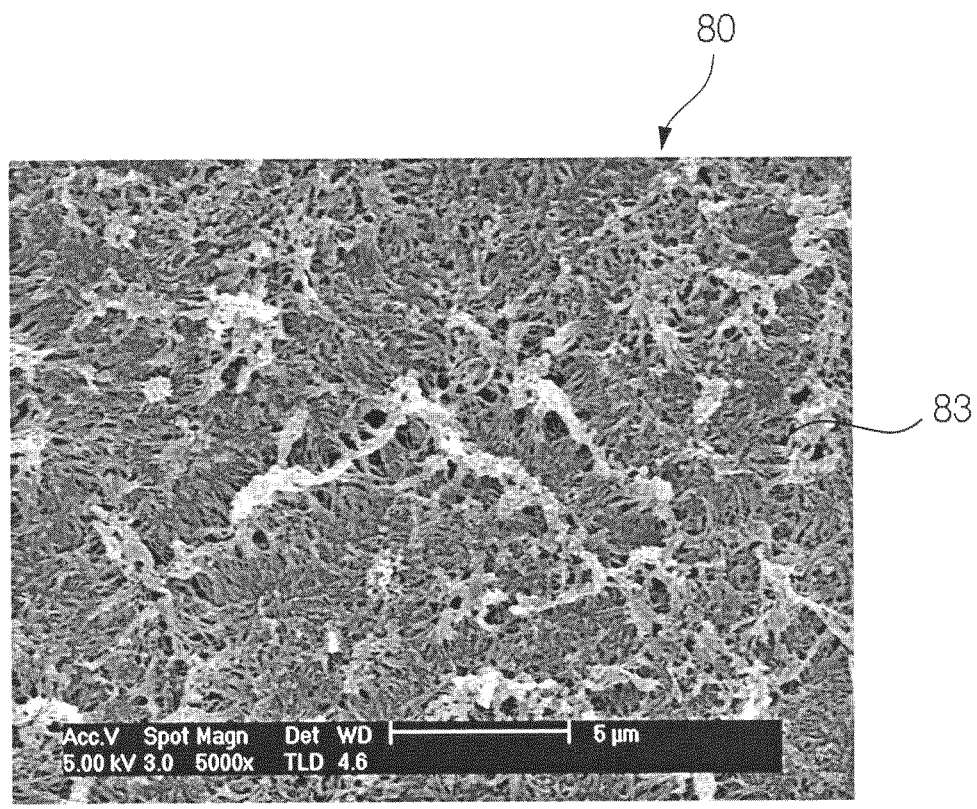

FIG. 15A and FIG. 15B are scanning electron microscope images of a solid body having a superhydrophobic surface that is formed using a sticking phenomenon due to van der Waals force. As shown, it can be noted that the protrusions 83 are stuck to each other on the surface of the polymer solid body 80 and irregularly settled down.

Figure 16:
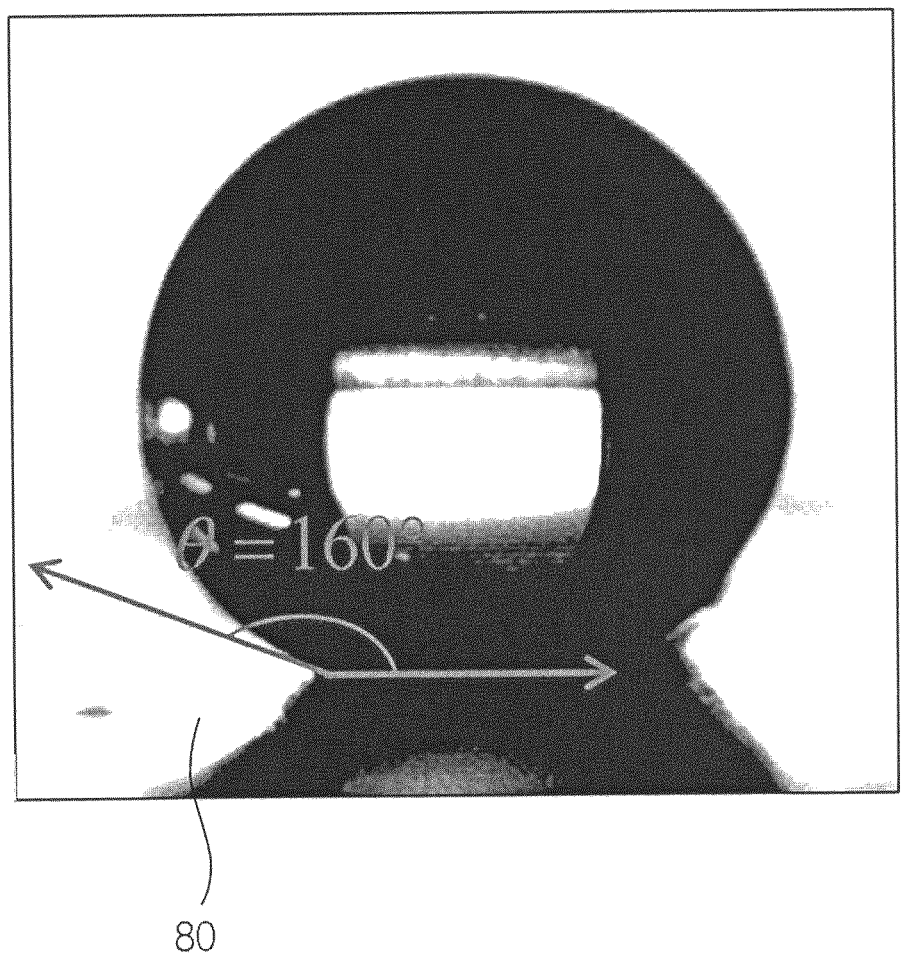
FIG. 16 is a photograph of a contact angle of a solid body surface and liquid according to the second exemplary embodiment of the present invention.

The solid body 80 having the above-described surface structure has minimum wettability through a structural surface treatment rather than a chemical coating process. When a drop of water is applied on the surface of the solid body 80 and a contact angle between the drop and the surface is measured, it can be noted that the contact angle is significantly increased up to 160°, as shown in FIG. 16. Generally, a contact angle between a drop of fluid and a surface of a solid body that is not processed is about 83°. Therefore, according to the exemplary embodiment of the present invention, it can be noted that, since the contact angle is significantly increased, the surface of the solid body has superhydrophobicity having minimum wettability.

In a like manner of the solid body 20 according to the first exemplary embodiment of the present invention, the solid body 80 according to the second exemplary embodiment of the present invention may be variously applied to a water supply tube, an artificial blood vessel, or an oil pipeline, which has been described above, and therefore detailed descriptions thereof will be omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The method for manufacturing the solid body having the superhydrophobic surface structure according to the exemplary embodiments of the present invention and the superhydrophobic fluid transfer tube using the method have the following effects.

First, by performing the replication process through a process for immersing the metal body provided with small holes that are formed through an anode oxidation process in a non-wetting material and for solidifying the non-wetting material, the replica can be easily and simply produced. Therefore, a solid body having a superhydrophobic surface can be easily produced using the replica, thereby reducing the production cost.

Second, since the solid body having the superhydrophobic surface structure is provided to an inner surface of a tube through which fluid flows, foreign materials are not accumulated in the tube, the inner surface of the tube is prevented from being corroded, and a fluid transfer rate increases.

The invention claimed is:

1. A superhydrophobic fluid transfer tube having a superhydrophobic surface structure, the superhydrophobic fluid transfer tube comprising:
   a fluid guider for guiding a fluid;
   a solid body that is provided on a fluid contact surface of the fluid guider and has micrometer-scaled unevenness and protrusions having nanometer-scaled diameters, wherein the solid body comprises a base provided on a fluid contact surface of the fluid guider and a surface structure having micrometer-scaled unevenness formed by a plurality of bunches formed by a plurality of adjacent protrusions that are formed on the base and have a nanometer-scaled diameter; and
   wherein a distance between the adjacent protrusions have nanometer-scaled diameters that are extremely short so that a van der Waals force attraction is generated between adjacent protrusions, and the micrometer-scaled unevenness are formed by the adjacent protrusions that are partly stuck to each other.

2. The superhydrophobic fluid transfer tube of claim 1, wherein the base has micrometer-scaled protrusions and depressions on at least a part of the surface; and
   the surface structure are provided along the micrometer-scaled protrusions and depressions of the base.

3. The superhydrophobic fluid transfer tube of claim 1 or claim 2, wherein the protrusions respectively having the nanometer-scaled diameter are formed of a non- wetting polymer material.

4. The superhydrophobic fluid transfer tube of claim 3, wherein the non-wetting polymer material is selected from the group consisting of polytetrahluorethylene (PTFE), fluorinated ethylene propylene copolymer (FEP), perfluoroalkoxy (PEA), and a combination thereof.

5. The superhydrophobie fluid transfer tube of claim 1, wherein the fluid guider is formed as a tube for guiding a fluid.

* * * * *